Oct. 15, 1929.  S. GIOVANNINI  1,731,337
NUT LOCK
Filed Feb. 20, 1928
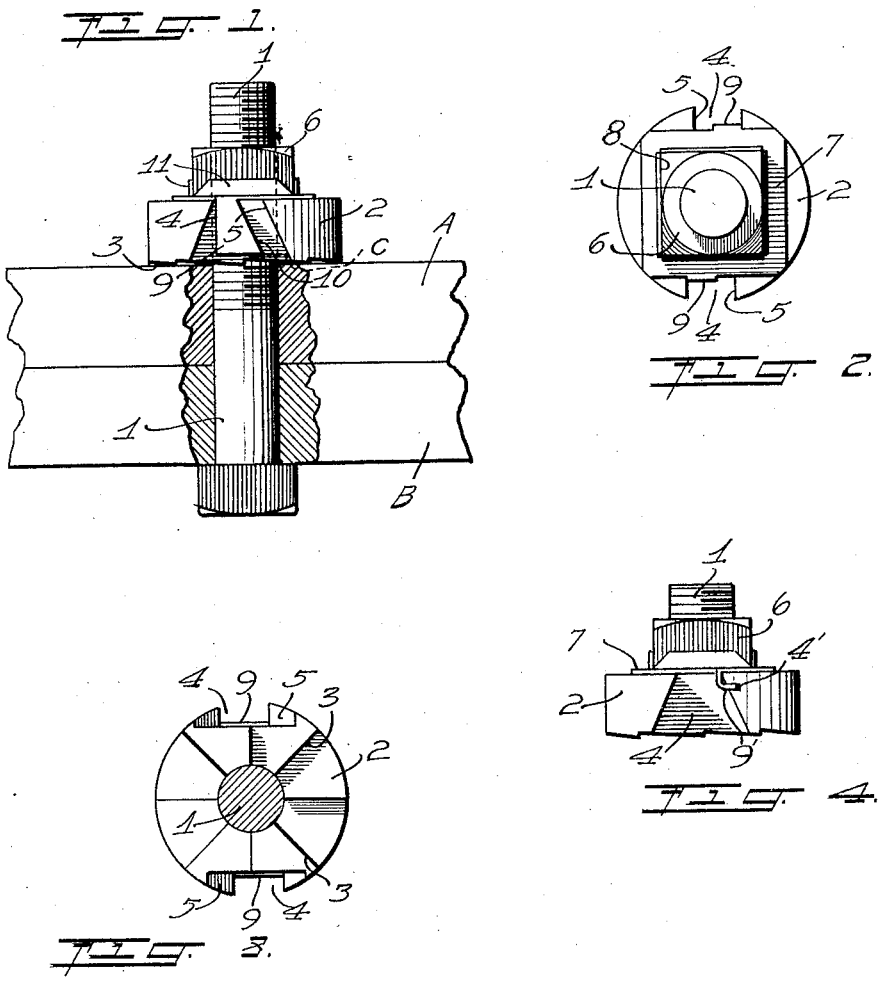
INVENTOR
S. GIOVANNINI
BY *Munn &Co.*
ATTORNEYS Patented Oct. 15, 1929

1,731,337

UNITED STATES PATENT OFFICE

SEBASTIAN GIOVANNINI, OF CHICAGO, ILLINOIS

NUT LOCK

Application filed February 20, 1928. Serial No. 255,840.

My invention relates to improvements in nut locks, and it consists in the combinations, constructions, and arrangements herein described and claimed.

An object of my invention is to provide a nut lock which may be applied to any standard bolt, thereby dispensing with the necessity of employing a specially constructed bolt.

A further object is to provide a nut lock which is adapted to lock the nut against rearward rotation, and in which means is provided and actuated by the rearward rotation of of the nut for firmly locking the nut against such rotation.

A further object is to provide a nut lock in which means is provided for firmly locking the nut against rearward rotation, regardless of the nature of the material through which the bolt is passed.

A further object is to provide a nut lock which is relatively simple in construction, durable and efficient for the purpose intended.

Other objects and advantages will appear in the following specification, and the novel features of the invention will be particularly pointed out in the appended claims.

My invention is illustrated in the accompanying drawings, forming part of this application, in which Figure 1 is a side elevation of my device, Figure 2 is a top plan view of the device shown in Figure 1, Figure 3 is a sectional view taken along the line 3—3 of Figure 1, and Figure 4 is a modified form of my device.

In carrying out my invention, I make use of a bolt 1. This bolt may be any one of the many standard types of bolts. In Figure 1, I have shown the bolt as passing through members A and B. A washer 2 having a plurality of teeth 3 cut in one face thereof is disposed upon the bolt and in such a manner that the teeth 3 are adjacent the member A. A recess 4 having angular surfaces 5 is provided in the periphery of the washer. A recess 4 is preferably provided on opposite sides of the washer 2. While I have shown the washer 2 as being provided with a pair of recesses 4, it will be understood that a single recess, as well as more than the number shown, may be employed.

A nut 6 is disposed upon the bolt, as shown in Figures 1 and 2. A locking device 7 provided with a central opening 8 conforming to the shape of the nut 6 is placed upon the latter. As will be seen from Figure 1, the locking device 7 is provided with ears 9 each having an angular edge 10. The outer ends of the ears 9 are wider than the bases of the ears, but are of such width as to permit the ears to pass into the recesses 4 at their narrowest points.

The locking device 7 is formed from relatively thin material and is provided with turned-up flanges 11 for the purpose of reinforcing the locking device.

From the foregoing description of the various parts of the device, the operation thereof may be readily understood. The bolt 1 is passed through the members A and B and the washer 2 is then placed so that the teeth 3 are disposed adjacent the member A. The nut 6 is placed upon the bolt and rotated inwardly upon the nut in the ordinary manner. When the nut 6 has been properly tightened, the locking device 7 is slipped upon the bolt for permitting the ears 9 to be passed into the recesses 4. The narrowest point in each of the recesses 4 is sufficiently wide to permit the widest end of the ears 9 to freely pass thereby.

It will be observed from Figure 1 that when the locking device 7 is first placed upon the nut, the angular edges 10 of the ears 9 are spaced away from the angular surfaces 5 of the recesses 4. A slight rearward rotation of the nut 6 will cause the ears 9 to be moved into the dotted line position C, whereby the locking device 7 is firmly secured upon the nut 6. The teeth 3 in the washer 2 prevent rotation of the washer, and it will thus be seen that after the nut 6 has been moved into the dotted line position C, the nut is firmly locked upon the bolt, since the washer 2 is locked against rotation by reason of the teeth 3.

In Figure 4, I have shown a modified form of my device in which the locking device 7 is provided with finger portions 9'. The finger portions 9' are disposed within the recesses 4 and enter small recesses 4' for holding the locking device 7 in proper position.

I claim:

1. A nut lock comprising a bolt, a nut for the latter, a washer having projections in one face thereof for locking the washer against rotation, said washer being provided with a plurality of recesses in the edge thereof and disposed upon the bolt adjacent said nut, said recesses being provided with angular surfaces, said recesses being smaller on the face of the washer adjacent the nut than on the opposite face, and a locking device having an opening conforming to the shape of the nut and arranged to be disposed upon the latter, said locking device being provided with a plurality of ears having angular edges, the outer ends of said ears being wider than the inner portion of the ears and substantially equal in width to the width of said recesses on that edge of the washer adjacent the nut, whereby said locking member may be moved longitudinally with respect to the bolt and disposed upon the nut for positioning the ears within said recesses, said angular edges being adapted to engage the angular surfaces of the recesses when the nut is rotated rearwardly for locking the nut against rearward rotation and the locking device against longitudinal movement away from the nut.

2. A nut lock comprising a bolt, a nut for the latter, a washer having projections in one face thereof for locking the same against rotation, said washer being provided with a recess in the edge thereof and disposed upon the bolt adjacent said nut, said recess being provided with an angular surface, and a locking device having an opening conforming to the shape of the nut and arranged to be disposed upon the latter, said locking device being provided with an ear having an angular edge arranged to be disposed within said recess when the locking device is moved longitudinally with respect to the bolt and disposed upon the nut, the inclined edge of said ear being arranged to engage the angular surface of said recess when the nut is rotated rearwardly for locking the nut against rearward rotation and the locking member against longitudinal movement away from the nut.

Signed at Chicago, in the county of Cook, and State of Illinois, this 17th day of February A. D. 1928.

SEBASTIAN GIOVANNINI.